US012631260B2

(12) United States Patent
    Sun et al.

(10) Patent No.: US 12,631,260 B2
(45) Date of Patent: May 19, 2026

(54) ELECTRIC VALVE AND THERMAL MANAGEMENT MODULE USING THE SAME

(71) Applicant: JOHNSON ELECTRIC INTERNATIONAL AG, Murten (CH)

(72) Inventors: Ning Sun, Shenzhen (CN); Penghao Feng, Shenzhen (CN); Ruifeng Qin, Hong Kong (CN); Tao Qu, Shenzhen (CN); Yong Shuai, Shenzhen (CN); Jiangcheng Xiao, Shenzhen (CN); Shudan Zhao, Shenzhen (CN); Fangqi Chen, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 18/883,141

(22) Filed: Sep. 12, 2024

(65) Prior Publication Data

US 2025/0092958 A1    Mar. 20, 2025

(30) Foreign Application Priority Data

Sep. 18, 2023    (CN) .......................... 202311209483.1

(51) Int. Cl.
    *F16K 11/074*        (2006.01)
    *F16K 27/04*         (2006.01)
                (Continued)
(52) U.S. Cl.
    CPC ........ *F16K 11/0743* (2013.01); *F16K 27/045* (2013.01); *F16K 31/041* (2013.01); *F16K 31/535* (2013.01); *F16K 41/023* (2013.01)

(58) Field of Classification Search
    CPC .. F16K 31/043; F16K 11/0743; F16K 27/045; F16K 31/041; F16K 31/535;
                (Continued)

(56) References Cited

U.S. PATENT DOCUMENTS

2006/0157662 A1    7/2006  Hidaka
2010/0096573 A1*   4/2010  Min ..................... G05D 7/0635
                                                        251/129.01
                (Continued)

FOREIGN PATENT DOCUMENTS

CN        112081954 B    12/2020
CN        217463309 U     9/2022
                (Continued)

OTHER PUBLICATIONS

Extended European Search Report from Corresponding EP Application No. 24199016.7 Jan. 23, 2025.

*Primary Examiner* — Marina A Tietjen
(74) *Attorney, Agent, or Firm* — Aird & McBurney LP

(57)            ABSTRACT
The invention provides an electric valve including a valve core, an actuating assembly to actuate the valve core and a housing receiving the valve core and the actuating assembly. The housing is provided with a partition plate dividing an internal space of the housing into a first space and a second space. The valve core and the actuating assembly are respectively accommodated in the first and second space and connected with each other via a through hole defined in a centre of the partition plate. The partition plate defines at least one diversion groove communicating with the through hole. Said at least one diversion groove extends through a sidewall of the housing.

12 Claims, 10 Drawing Sheets

(51) Int. Cl.
    *F16K 31/04*     (2006.01)
    *F16K 31/53*     (2006.01)
    *F16K 41/02*     (2006.01)
(58) Field of Classification Search
    CPC ........ F16K 41/023; F16K 31/04; F16K 11/06;
               F16K 27/04; B60H 1/00642; H02K 5/10
    See application file for complete search history.

(56)                References Cited

U.S. PATENT DOCUMENTS

2019/0032785 A1 * 1/2019 Edmond ............... F16K 41/046
2024/0288080 A1 * 8/2024 Wang ................... F16K 11/087

FOREIGN PATENT DOCUMENTS

CN        218582336 U    3/2023
CN        219082326 U    5/2023
CN        118728999 A  * 10/2024  ............ B60K 11/02
EP         3434940 A1    1/2019
WO   WO-2022268155 A1 * 12/2022  ............ F16K 11/087
WO   WO-2023226957 A1 * 11/2023  ............ F16K 27/067

* cited by examiner

A

A

ELECTRIC VALVE AND THERMAL MANAGEMENT MODULE USING THE SAME

CROSS REFERENCE TO RELATED APPLICATIONS

This non-provisional patent application claims priority from Chinese Application No. 202311209483.1 filed Sep. 18, 2023, which is incorporated herein by reference in its entirety.

FIELD OF THE INVENTION

This application relates to the field of heat exchange technology, in particular to a thermal management system and a valve thereof.

BACKGROUND

Valves are widely used to control a flow of fluid such as water, steam, refrigerant, etc. in pipelines. For example, it is applied in a thermal management system for an electric vehicle to adjust flow rate and directions of heat exchange medium in different multiple fluid circuits, such as a driving motor fluid circuit, a battery fluid circuit, a passenger cabinet fluid circuit, etc.

The electric valve includes a driving unit to rotate a valve core to interconnect different valve ports thereof, and then enable the valve to be in various working states. However, there is risk of leakage of the fluid to cause electrical safety hazards.

SUMMARY OF THE INVENTION

The present disclosure aims to provide an electric valve and a thermal management module using the electric valve that can effectively satisfy the heat exchange needs under various working conditions In one aspect, the present disclosure provides an electric valve including a valve core, an actuating assembly to actuate the valve core and a housing receiving the valve core and the actuating assembly. The housing is provided with a partition plate dividing an internal space of the housing into a first space and a second space. The valve core and the actuating assembly are respectively accommodated in the first and second space and connected with each other via a through hole defined in a centre of the partition plate. The partition plate defines at least one diversion groove communicating with the through hole. Said at least one diversion groove extends through a sidewall of the housing.

Preferably, the at least one diversion groove includes a plurality of diversion grooves distributed at intervals around the through hole, each diversion groove extends radially along the partition plate.

Preferably, the plurality of diversion grooves includes three diversion grooves.

Preferably, a cross-sectional area of each diversion groove is gradually increased from a radial inner end to a radial outer end.

Preferably, the partition plate is provided with a plurality of ribs extending radially, each of the diversion grooves is defined in one of the ribs.

Preferably, the valve core is provided with a first coupling portion extending towards the partition plate, the actuating assembly includes a motor and a driving member driven by the motor; the driving member is provided with a second coupling portion\extending towards the partition plate to be engaged with the first coupling portion; the radial inner end of each of the diversion grooves is offset in an axial direction from the second coupling portion of the driving member.

Preferably, a first mounting position and a second mounting position are defined in the second space; the actuating assembly includes a motor and a driving member driven by the motor, the motor is selectively installed at the first mounting position or the second mounting position, and the driving member is in transmission connection with the valve core.

Preferably, the motor is selected from a first motor adapted for being installed at the mounting position, and a second motor adapted for be installed at the second mounting position, the first motor is a brushless DC motor, the second motor is a brush DC motor.

Preferably, the first mounting positions and the second mounting positions are located on opposite sides of the through hole and close to the sidewall.

Preferably, the actuating assembly further comprises a first transmission mechanism or a second transmission mechanism, the first transmission mechanism is adapted for being connected between the first motor and the driving member; the second transmission mechanism is adapted for being connected between the second motor and the driving member, the first and second transmission mechanisms share some part.

Preferably, the housing comprises a valve housing defining the first space and an actuator housing defining the second space, the valve housing, the actuator housing, and the partition plate are integrally formed.

In another aspect, the present disclosure provides a thermal management module including a manifold and the electric valve mounted onto the manifold, the manifold is provided with a plurality of ports.

Preferably, the end plate is mounded to an end of the housing close to the valve core, the manifold and the end plate are integrally formed, the end plate defines a plurality of openings, the valve core defines a plurality of flow channel extending through the end of the valve core and correspondingly communicate with the openings of the end plate.

Preferably, a sealing member is sandwiched between the end plate and the valve core.

DETAILED DESCRIPTION OF THE PREFERRED EMBODIMENTS

The present invention will be further described below based on the drawings and the embodiments.

Figure 1:
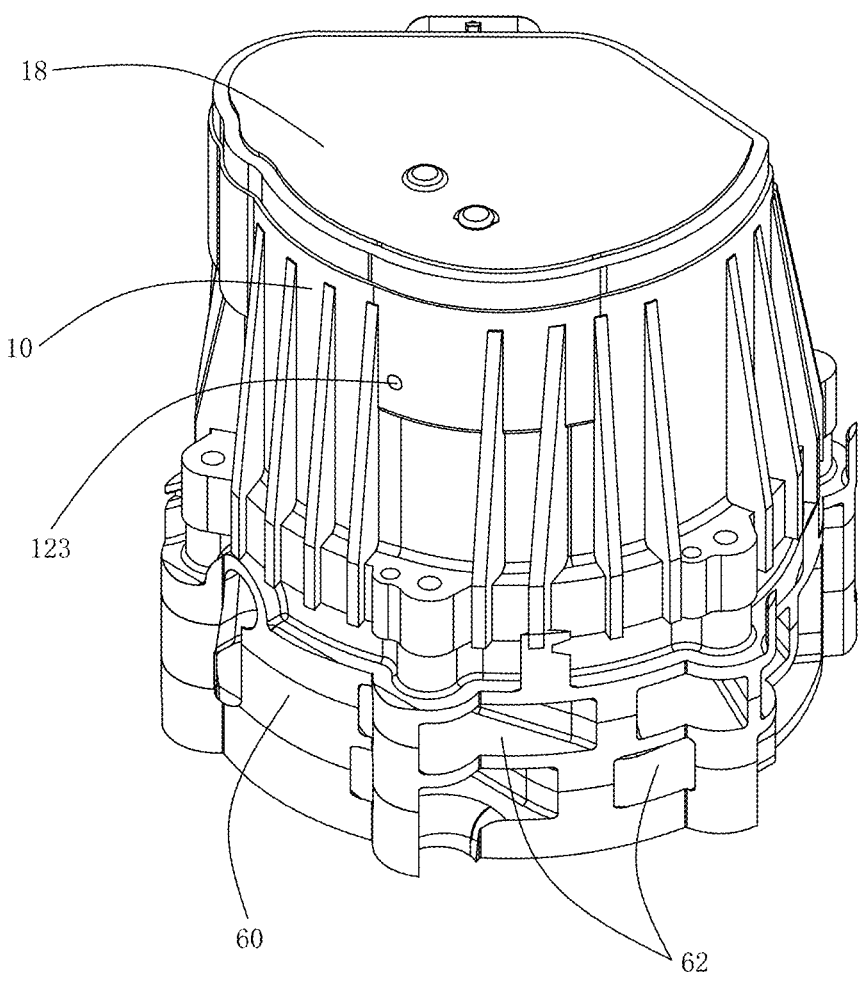
FIG. 1 is a schematic diagram of the structure of an electric valve according to an embodiment of the present invention.
Figure 2:
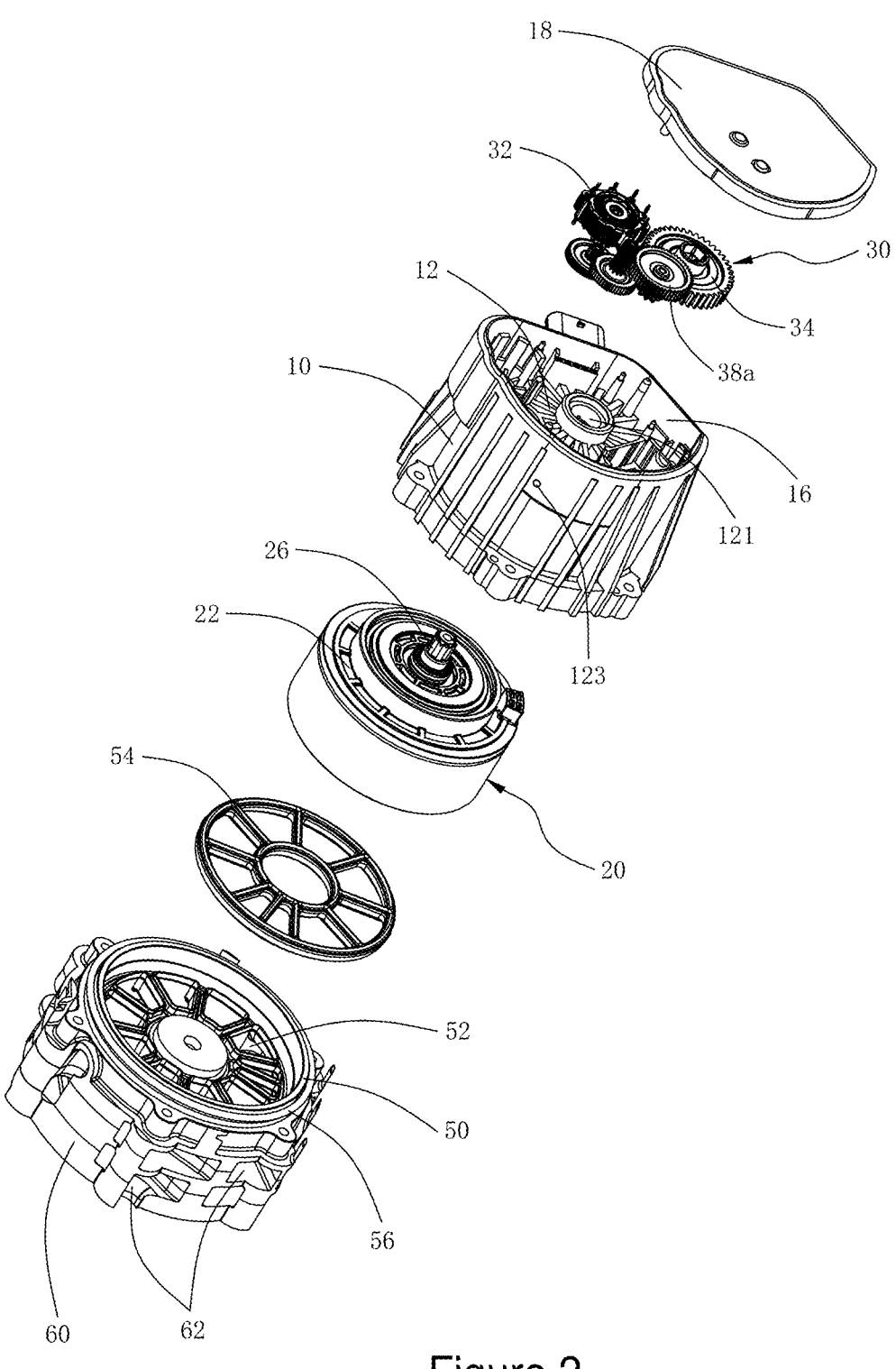
FIG. 2 is an exploded view of the electric valve shown in FIG. 1.
Figure 3:
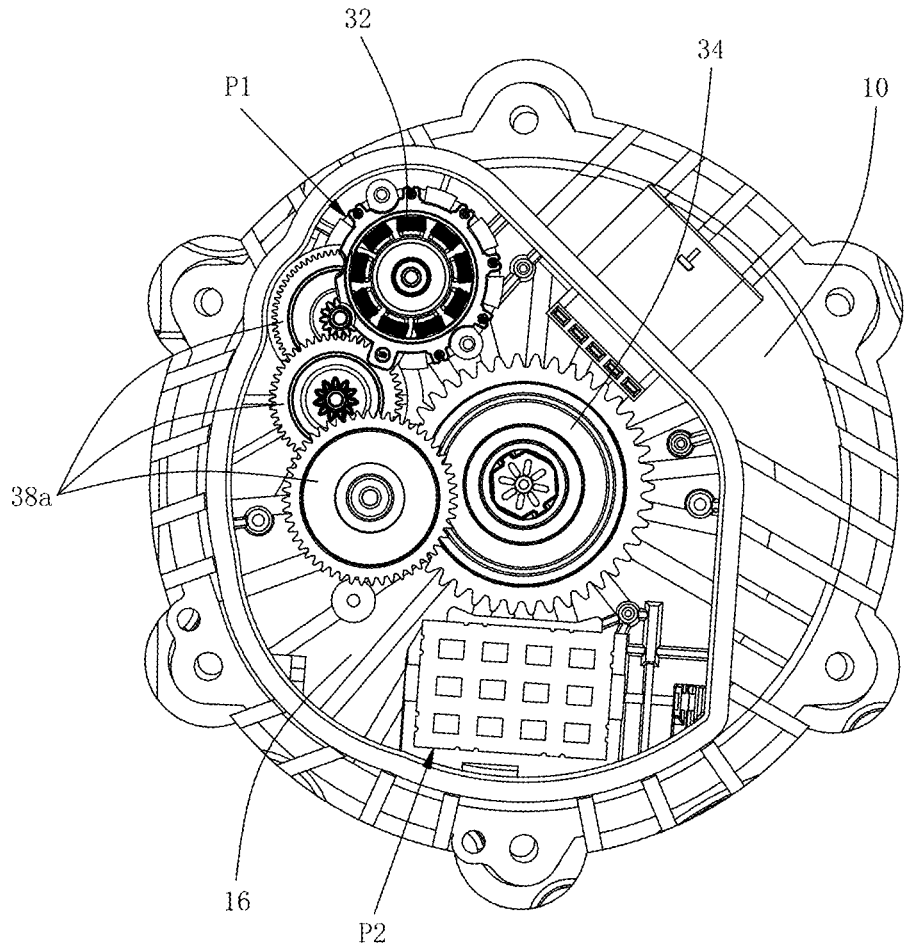
FIG. 3 is a top view of the electric valve shown in FIG. 1 with the end cap removed.
Figure 5:
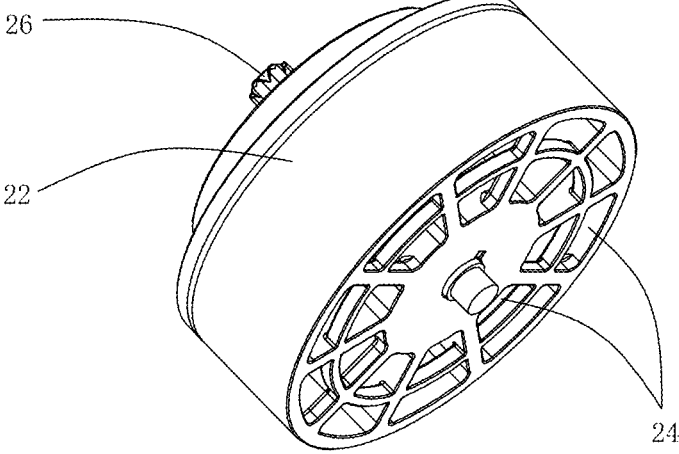
FIG. 5 is perspective view of the valve core of the electric valve of FIG. 2 in a different aspect.

The electric valve according to a first embodiment is configured to be applied in various fluid circuits, such as multiple fluid circuits of a thermal management module of an electric vehicle, to regulate the flow direction and/or flow rate of fluids (such as water, steam, etc.), thereby satisfying requirements under various working conditions. Referring to FIG. 1-3, an embodiment of an electric valve in the present application includes a housing 10, and a valve core 20 and an actuating assembly 30 accommodated in the housing 10. The valve core 22 defines a plurality of flow channels 24 (see FIG. 5); The actuating assembly 30 includes a motor 32 and a driving member 34 that is in transmission connection with the motor 32; The driving member 34 is in transmission connection with the valve core 22, so that the motor 32 can drive the valve core 22 to rotate to enable the electric valve to be switched among different working statuses.

Figure 4:
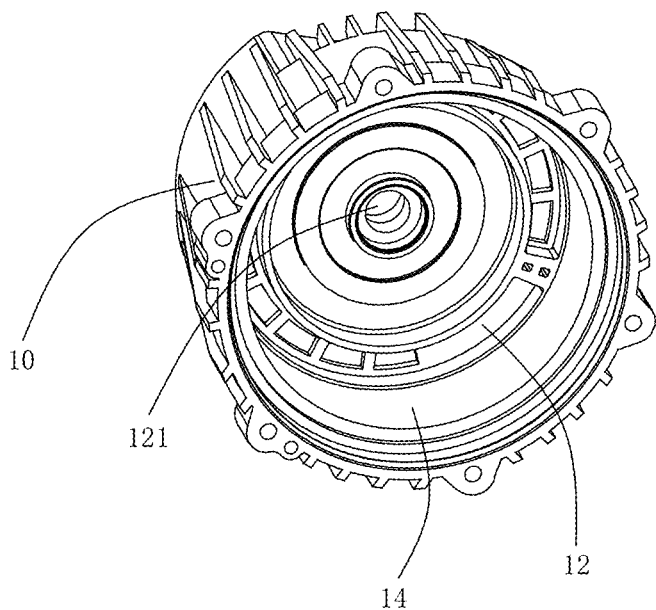
FIG. 4 is perspective view of the housing of the electric valve of FIG. 2 in a different aspect.

Referring FIG. 2 and FIG. 4, the housing 10 is cylindrical as a whole, and provided with a partition plate 12 inside. The partition plate 12 divides the internal space of the housing 10 into a first space 14 and a second space 16 respectively configured to receive the valve core 22 and the actuating assembly 30. A part of a wall of the housing 10 to bound the first space 14 acts as a valve housing; Another part of the housing 10 configured to bound the second space 16 acts as an actuator housing. A through hole 121 is defined in a centre of the partition plate 12 to enable a connection between the driving member 34 of the actuating assembly 30 and the valve core 22. In present embodiment, the housing 10, which includes a valve housing, an actuator housing, and a partition plate 12 integrally formed. Specifically, the housing 10 is integrally formed by injection moulding to simplify an assembly process of the valve housing and the actuator housing.

In one embodiment, a controller is mounded inside the second space 16. The controller is a circuit board provided with control circuits configured to be electrically connected to a controlling end of the motor 32 for a manipulation of the motor 32, such as start-stop, reversing, and rotation speed reregulation etc., so that the valve core 22 can accurately rotate to the expected position. In present embodiment, the housing has opposite axial ends, which is convenient for mounting of the valve core 22, and actuator assembly 30 inside the housing 10. An end cap 18 is mounted to the end of the housing 10 adjacent to the actuator assembly 30 to enclose the second space 16, thereby avoid external water vapor, dust, etc. from entering the second space 16 to interfere with a safe operation of the motor 32 and the controller.

Figure 6:
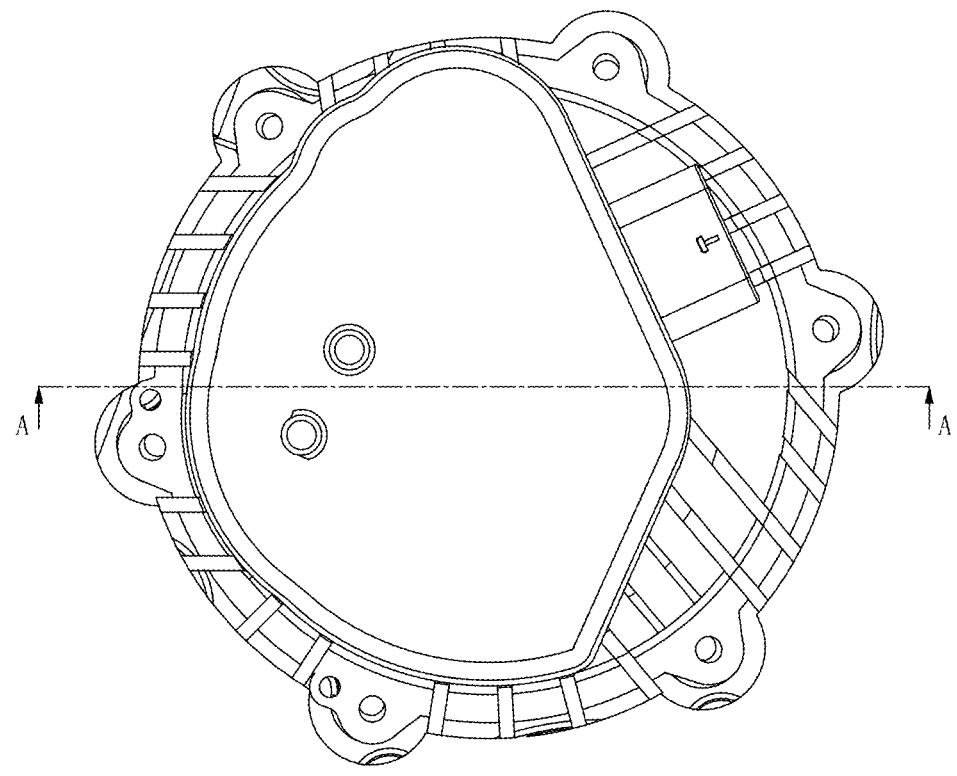
FIG. 6 is a side view of the electric valve of FIG. 1.
Figure 7:
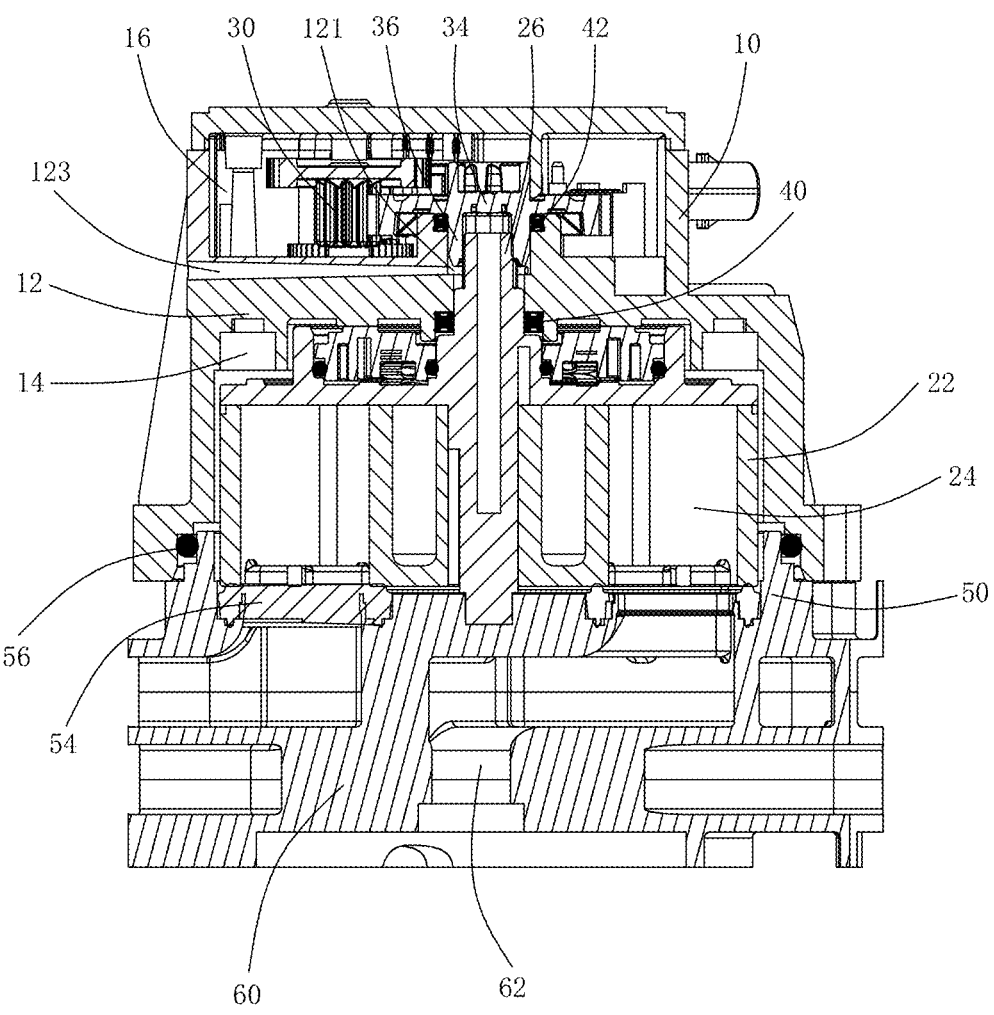
FIG. 7 is a cross-sectional view of the electric valve of FIG. 6 taken along the line A-A.

Referring also to FIGS. 2, 6 and 7, a first coupling portion 26 extends from a centre of the valve core 22 towards the partition plate 12. A second coupling portion 36 extends from the driving member 34 of the actuating assembly 30 towards the partition plate 12. The first coupling portion 26 extends through the through hole 121 to be engaged with the second coupling portion 36. In present embodiment, the first coupling portion 26 is shaft. The second coupling portion 36 is a hub. A distal end of the shaft is fixedly engaged in the hub. In another embodiment, the first coupling portion 26 can be a hub, and the second coupling portion 36 can be a shaft. Alternatively, the first coupling portion 26 and the second coupling portion 36 are two shafts, which are engaged with each other by a shaft coupler and the like.

Preferably, each of the first coupling portion 26 and the second coupling portion 36 is provided with a circumferential limit, so that the valve core 22 can be driven to rotate synchronously with the driving member 34. For example, the cross-section of the first coupling portion 26 and the second coupling portion 36 is non-circular, such as D-shaped, star-shaped, square-shaped, etc.; Alternatively, the first coupling portion 26 and the second coupling portion 36 are connected by means of a spline, or welding, bonding, etc., to realize the circumferential limit. It should be understood that as long as the first coupling portion 26 and the second coupling portion 36 can realize power transmission, their specific structure and connection mode are not limited to the above embodiments.

Referring to FIG. 6 to FIG. 9, the partition plate 12 of housing 10 defines a plurality of diversion groove 123 substantially extending along a radial direction of the partition plate 12. An inner end of each diversion groove 123 communicates with the through hole 121. Each diversion groove 123 extends through a sidewall of the housing 10 to enable an outer end of the diversion groove 123 to communicate with an outside of the housing 10. In other words, the through hole 121 of the partition plate 12 communicates with outside of the housing 10 through the diversion grooves 123. In operation of the electric valve, liquid probably leaking from between the partition plate 12 and the first coupling portion 26 will be led to outside of the valve housing 10 through the diversion groove 123. So that the liquid is prevented from entering the second space 16 and an electrical safety of electronic devices such as the motor 32, the controller etc. in the second space 16 is ensured.

Figure 8:
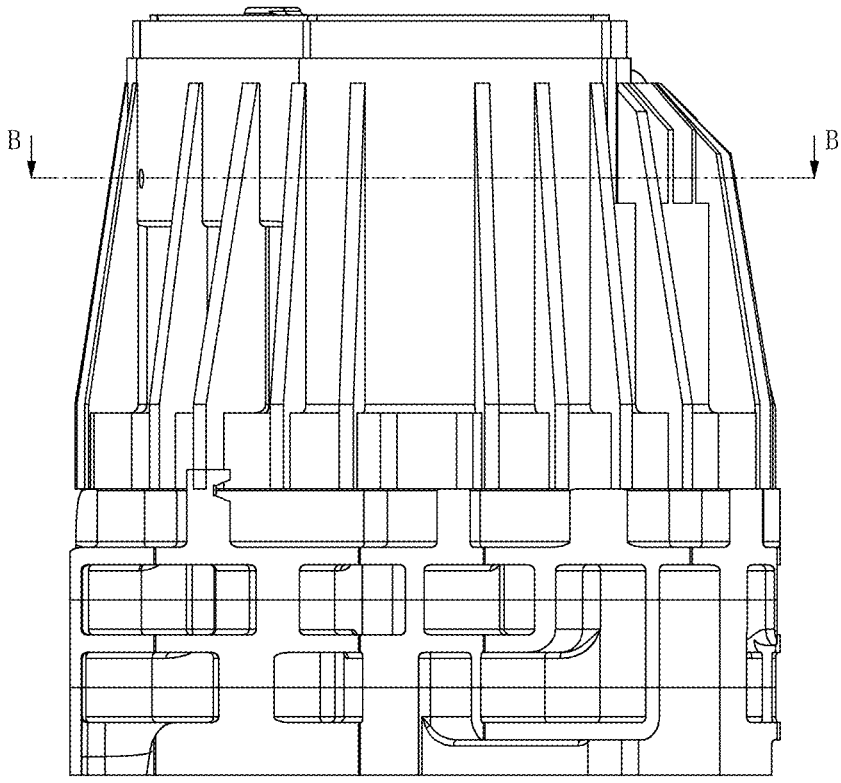
FIG. 8 is a side view of the electric valve of FIG. 1 in a different aspect.
Figure 9:
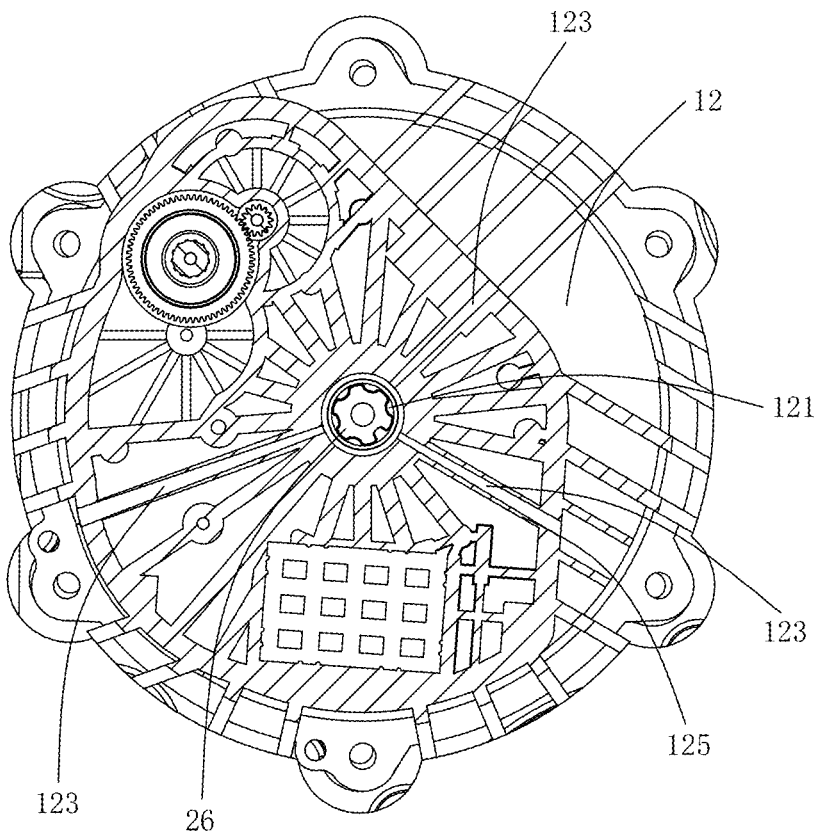
FIG. 9 is a cross-sectional view of the electric valve of FIG. 8 taken along the line B-B.

Referring to FIGS. 8 and 9, the diversion grooves 123 are distributed at intervals around the through hole 121. Each diversion groove 123 extends radially along the partition plate 12. In present embodiment, the plurality of the diversion grooves 123 includes 3 diversion grooves 123. Usually, the electric pump is placed horizontally, which enable at least one diversion groove 123 to extend downwards. So that leaking fluid can automatically flow outward along the diversion groove 123 due to its own gravity. Preferably, as shown in FIG. 7, A cross-sectional area of each diversion groove 123 is gradually increased from the inner end to the outer end to further facilitate discharging of the leaking liquid.

Preferably, the inner end of each of the diversion grooves 123 is offset in the axial direction from the second coupling portion 36 of the driving member 34 and closer to the first space 14 than the second couple portion 36, so that the leaking fluid will be led to diversion grooves 123 before reach a joint between the second couple portion 36 and the partition plate 12 and be avoided from flowing to the second space 16. In present embodiment, the partition plate 12 is provided with a plurality of ribs 125 extending radially to enhance an overall strength of the partition plate 12. Each of the diversion grooves 123 is defined in one of the ribs 125 to enable the diversion groove 123 with a larger width without significantly reduce the strength of the partition plate 12.

Referring to FIG. 7, the first couple portion 26 and the second couple portion 36 are sealed with the partition plate 12, respectively. Specifically, the two sides of the partition plate 12 form a first ring groove and a second ring groove at its inner edge, that is, at the position surrounding the through hole 121, the first sealing ring 40 is embedded in the first ring groove and closely sockets the first couple portion 26, the partition plate 12 is sealed with the first couple portion 26, and the fluid of the first space 14 is avoided from entering the through hole 121 of the partition plate 12 by the gap between the two as far as possible; The second sealing ring 42 is embedded in the second ring groove and is tightly sleeved with the second couple portion 36, and the partition plate 12 is sealed with the second couple portion 36 to avoid the fluid in the through hole 121 from entering the second space 16 via the gap between the two.

The motor 32 is the power source of the whole electric valve, which can be a DC motor, a stepper motor, and the like. In this embodiment, as shown in FIG. 3, two independent mounting positions are arranged in the second space 16 of the housing 10, namely a first mounting position P1 and a second mounting position P2. The first mounting position P1 and the second mounting position P2 are somewhat different in structure and size, so as to adapt for different motors 32, respectively. Different motors have different advantages and disadvantages and can be used in different work circumstances. For example, brushless DC motors have the advantages of long life and high efficiency; DC brush motor has the advantages of low noise and self-locking; Stepper motors have the advantages of high progress and stable operation.

Since the housing 10 is provided with two mounting positions P1 and P2 in the second space 16, two kinds of motors 32 can be selectively installed in the housing 10. In other words, the housing 10 and related parts are universal component to adapt for various kinds of motors to enable the electric valve to be used in different work circumstances. Therefore, the number of moulds and parts can be effectively reduced. Specifically, the first mounting positions P1 and the second mounting positions P2 are substantially located on opposite sides of the through hole 121 and are close to the sidewall oof the housing 10 to make full use of an inner space of the housing 10. As a result, even with two mounting positions, P1 and P2, the radial size of the electric valve will not be increased. Furthermore, an enough space inside the actuator housing between the two mounting positions P1 and P2 can be preserved for installing the driving member 34 and the like.

Referring to FIGS. 1-3, in one circumstance, the motor 32 is a brushless DC motor installed at the first mounting position P1. The second mounting position P2 is unoccupied. In this embodiment, the driving member 34 is a gear. A transmission mechanism 38*a* is connected between the motor 32 and the driving member 34. The transmission mechanism 38*a* includes a multi-stage gear train with multiple spur gears. The transmission mechanism 38*a* can enable a power output of the motor 32 to be transmitted for deceleration and torque conversion.

Figure 10:
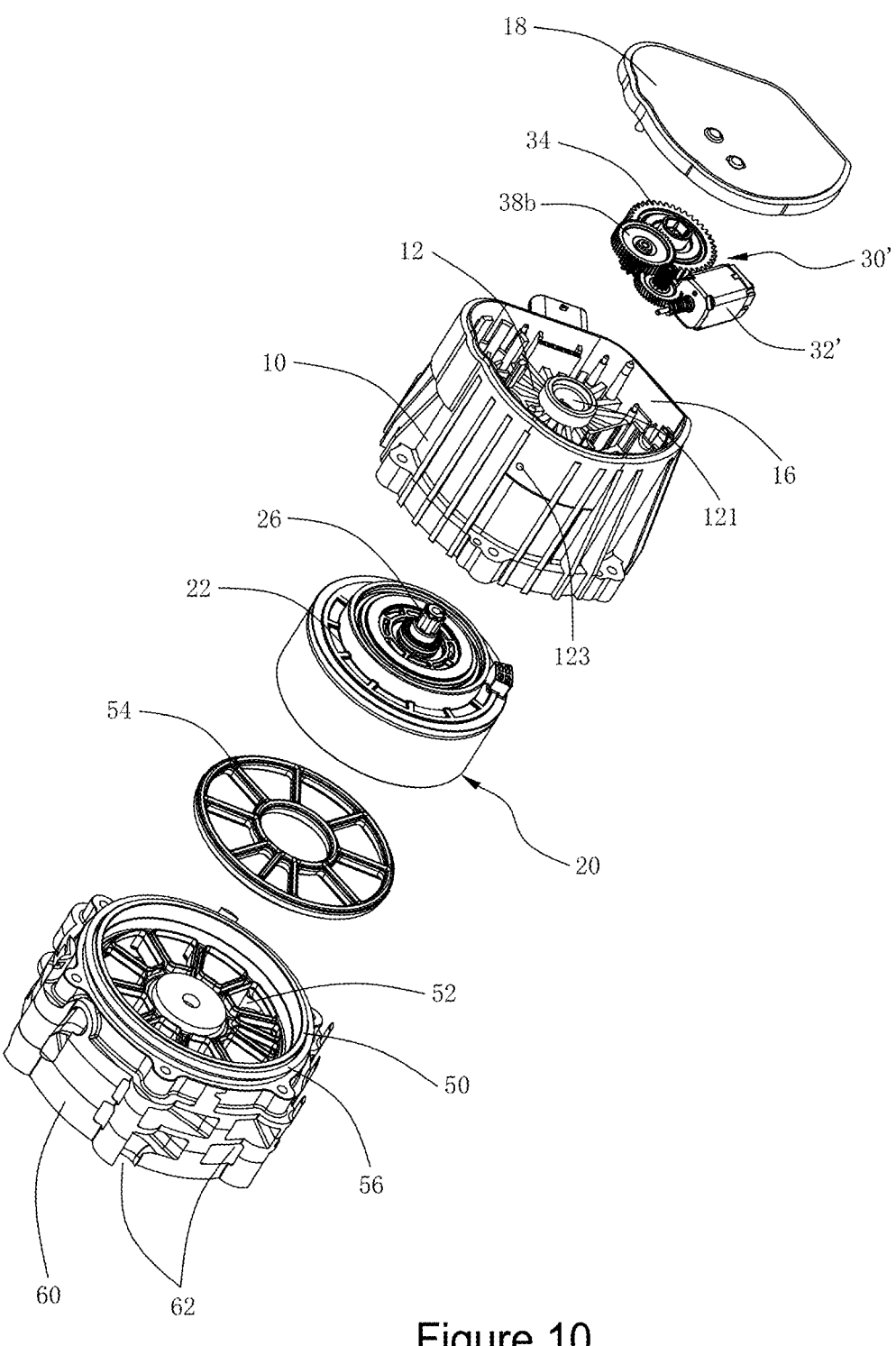
FIG. 10 is an exploded view of an electric valve according to another embodiment of the present invention.
Figure 11:
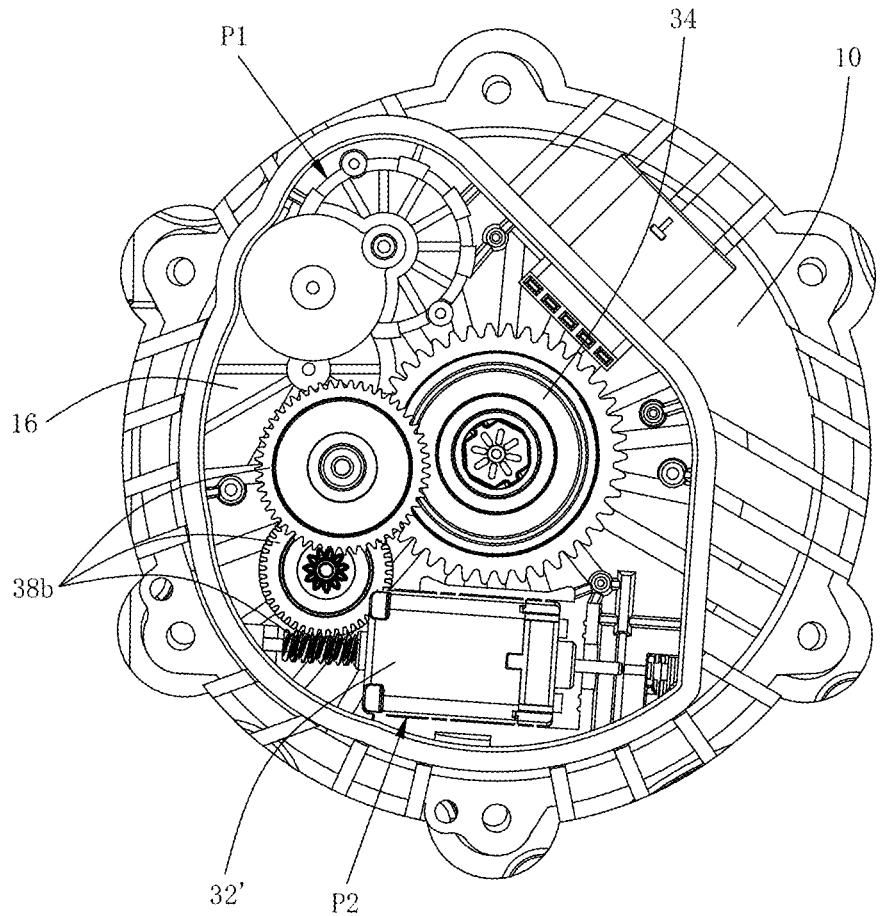
FIG. 11 is a top planner view of the electric valve of FIG. 10 with the end cap removed.

Referring to FIGS. 10-11, in another circumstance, the motor 32 is a DC brush motor and is installed at the second mounting position P2 of the housing 10. Correspondingly, the first mounting position P1 is unoccupied. A transmission mechanism 38*b* is arranged between the motor 32 at the second mounting position P2 and the driving member 34. The transmission mechanism 38*b* includes a worm gear and a multi-stage gear train with multiple spur gears, the transmission mechanism 38*b* can enable a power output of the motor 32 to be transmitted for deceleration and torque conversion.

The transmission mechanism 38*a* and 38*b* can have one or more shared parts. It should be understood that the motor is not limited to the above two kinds. The user can choose a suitable kind of motor according to the application scenarios of the electric valve. Correspondingly, the transmission mechanism is not limited to the embodiment description above. In addition, the driving member 34 can also be directly driven by the motor 32, without any transmission mechanism.

Referring to FIG. 2, FIG. 7, an end plate 50 is mounded to an end of the housing 100 close to the valve core 20 (far away from the actuating assembly 30). The end plate 50 defines a plurality of openings 52. The flow channels 24 of the valve core 22 extend through an end face of the valve core 22 towards the end plate 50, and selectively communicate with corresponding openings 52 of the end plate 50. A sealing member 54 is clamped between the end plate 50 and the valve core 22. In one embodiment, the sealing member 54 is a rubber gasket. The sealing member 54 defines a plurality of cutouts correspondingly aligned with the openings to the end plate 50, so that the conduction of the flow channel 24 and openings 52 of the end plate 50. Furthermore, another sealing ring 56 is clamped between an outer circumferential edge of the end plate 50 and the sidewall of the housing 10 to enable a sealing between the two.

In present embodiment, the electric valve is mounted onto a manifold 60 to form a thermal management module. The manifold 60 is arranged at the end of the electric valve close to the valve core 20 and includes a plurality of port 62. Inner ends of the ports 62 are correspondingly in communication with the opening 52 of the end plate 50. Outer end of the ports 62 are adapted for connecting external pipes. Preferably, the manifold 60 and the end plate 50 are integrally formed. In addition, in present embodiment, the end plate 50 and the housing 10 are separable form each other rather than just integrally formed with each other. Therefore, it is convenient to adapt the valve to different operating requirements by just replacing only the end plate 50 and the manifold 60 instead of replacing the entire valve, which further brings advantages of shorter lead time of products, and low cost.

Although certain inventive embodiments of the present disclosure have been specifically described, the present disclosure is not to be construed as being limited thereto. Various changes or modifications may be made to the present disclosure without departing from the scope and spirit of the present disclosure.

The invention claimed is:

1. An electric valve comprising:
a valve core;
an actuating assembly to actuate the valve core; and
a housing receiving the valve core and the actuating assembly; wherein the housing is provided with a partition plate dividing an internal space of the housing into a first space and a second space, the valve core and the actuating assembly are respectively accommodated in the first and second space and connected with each other via a through hole defined in a centre of the partition plate; the partition plate defines at least one diversion groove communicating with the through hole, said at least one diversion groove extends through a sidewall of the housing to enable the diversion groove to communicate with an outside of the housing;
wherein said at least one diversion groove comprises a plurality of diversion grooves distributed at intervals around the through hole, each diversion groove extends radially along the partition plate; a cross-sectional area of each diversion groove is gradually increased from a radial inner end to a radial outer end.

2. The electric valve of claim 1, wherein the plurality of diversion grooves comprises three diversion grooves.

3. The electric valve of claim 1, wherein the partition plate is provided with a plurality of ribs extending radially, each of the diversion grooves is defined in one of the ribs.

4. The electric valve of claim 3, wherein the valve core is provided with a first coupling portion extending towards the partition plate, the actuating assembly comprises a motor and a driving member driven by the motor; the driving member is provided with a second coupling portion extending towards the partition plate to be engaged with the first coupling portion; a radial inner end of each of the diversion grooves is offset in the axial direction from the second coupling portion of the driving member.

5. The electric valve of claim 4, wherein a first mounting position and a second mounting position are defined in the second space; the motor of the actuating assembly is selectively installed at the first mounting position or the second mounting position, and the driving member is in transmission connection with the valve core.

6. The electric valve of claim 5, wherein the motor is selected from a first motor adapted for being installed at the first mounting position, and a second motor adapted for be installed at the second mounting position, the first motor is a brushless DC motor, the second motor is a brush DC motor.

7. The electric valve of claim 5, wherein the first mounting position and the second mounting position are located on opposite sides of the through hole and close to the sidewall.

8. The electric valve of claim 6, wherein the actuating assembly further comprises a first transmission mechanism or a second transmission mechanism, the first transmission mechanism is adapted for being connected between the first motor and the driving member; the second transmission mechanism is adapted for being connected between the second motor and the driving member, the first and second transmission mechanisms share some part.

9. The electric valve of claim 1, wherein the housing comprises a valve housing defining the first space and an actuator housing defining the second space, the valve housing, the actuator housing, and the partition plate are integrally formed.

10. A thermal management module comprising a manifold and the electric valve of claim 1 mounted onto the manifold, the manifold is provided with a plurality of ports.

11. The thermal management module of claim 10, wherein an end plate is mounted to an end of the housing close to the valve core, the manifold and the end plate are integrally formed, the end plate defines a plurality of openings, the valve core defines a plurality of flow channel extending through the end of the valve core and correspondingly communicate with the openings of the end plate.

12. The thermal management module of claim 11, wherein a sealing member is sandwiched between the end plate and the valve core.

\* \* \* \* \*